United States Patent Office 3,446,815
Patented May 27, 1969

3,446,815
PREPARATION OF AMINOPHENYL-
NITROIMIDAZOLES
Janos Kollonitsch, Westfield, N.J., assignor to Merck & Co., Inc., Rahway, N.J., a corporation of New Jersey
No Drawing. Filed Sept. 2, 1966, Ser. No. 576,820
Int. Cl. C07d 49/36
U.S. Cl. 260—309                                      3 Claims

ABSTRACT OF THE DISCLOSURE 2-(aminophenyl)-4(5)-nitroimidazoles are prepared by reduction of 2-(nitrophenyl)-4(5)-nitroimidazoles. The 2-(aminophenyl)-4(5)-nitroimidazoles are useful as intermediates in the preparation of 2 - halophenyl - 5 - nitroimidazoles which in turn are useful in the treatment of protozoan-caused diseases.

---

This invention relates to processes for reducing nitro groups to amino groups. More particularly, it is concerned with a method of reducing nitrophenyl compounds to the corresponding aminophenyl compounds. Specifically, it is concerned with a method for reducing a 2-(nitrophenyl)-4(5) - nitroimidazole to the corresponding 2 - (aminophenyl)-4(5)-nitroimidazole.

The 2-halophenyl-5-nitroimidazoles having an alkyl or hydroxyalkyl substituent in the 1-position have antiparasitic activity and are particularly useful in the treatment of protozoan-caused diseases. Thus, they are effective in the treatment of a poultry disease known as histomoniasis, which is due to a protozoan parasite *Histomonas meleagridis*. This disease, also known as turkey blackhead or enterohepatitis, is a serious economic problem in the turkey raising industry. In addition, the nitroimidazole compounds are active against *T. vaginalis* and are therefore useful in the treatment of vaginal infections due to this protozoan parasite.

One process for the preparation of these 2-halophenyl-5-nitroimidazoles involves reduction of the 2-(nitrophenyl)-4(5)-nitroimidazole to the corresponding 2-aminophenyl compound, which can then be halogenated to produce the corresponding 2-halophenyl compound. The 2-halophenyl compound can then be reacted to introduce the 1-alkyl or 1-hydroxyalkyl substituent to produce the desired 1-substituted-2-halophenyl-5-nitroimidazole.

The step of converting the 2-(nitrophenyl)-4(5)-nitroimidazole to the 2-aminophenyl compound has been effected by suspending the nitrophenyl compound in a mixture of alcohol and ammonia and passing in hydrogen sulfide. However, this method for reducing the nitrophenyl compound results in low yields of the desired product, and therefore other methods have been sought to provide a more economical process.

It is an object of this invention to provide an improved process for reducing nitrophenyl compounds to aminophenyl compounds. Another object of this invention is to provide an improved method for selectively reducing 2-(nitrophenyl) - 4(5) - nitroimidazole to 2-(aminophenyl)-4(5)-nitroimidazole in improved yields. Other objects will be apparent from the detailed description of this invention hereinafter provided.

In accordance with my invention, I have now found that nitrophenyl compounds can be converted in high yields to the corresponding aminophenyl compounds by carrying out the reduction in an aqueous medium with ammonium sulfide under alkaline conditions, i.e., at a pH of 8 or higher. Thus, this method can be utilized to selectively reduce 2-(nitrophenyl)-4(5)-nitroimidazoles to obtain the desired 2 - (aminophenyl) - 4(5)-nitroimidazoles in high yields. In carrying out the reduction in accordance with my improved procedure, the nitrophenyl compound is first added to an aqueous solution of ammonia, an aqueous solution of ammonium sulfide in an amount equivalent to at least 1 mole of ammonium sulfide per mole of nitrophenyl compound is added, and the reaction permitted to continue until completion of the reduction. The desired aminophenyl compound is then recovered from the resulting reaction mixture.

In this process, it is important that the reaction mixture for the reduction be at a pH of at least 8, and it is therefore necessary that there be an excess of ammonia in the reaction mixture. I therefore find it desirable to use an amount of ammonia equivalent to at least 5 moles per mole of the nitrophenyl compound being reduced to insure that the desired alkaline condition will prevail. Amounts of ammonia in excess of the equivalent of 5 moles per mole of compound being reduced can be used, depending upon the particular compound being reduced. The temperature at which the reduction is effected is not critical, and my improved process can be carried out at temperatures between about 0 and 80° C., preferably about 20–50° C.

Following the completion of the reduction, the desired aminophenyl compound can be recovered from the resulting reaction mixture by processes known to those skilled in this art. Thus, when 2-(nitrophenyl)-4(5)-nitroimidazole is reduced to 2-(aminophenyl)-4(5)-nitroimidazole, the reduced product is recovered from the reaction mixture by acidifying it, preferably with a mineral acid such as hydrochloric acid, which causes the precipitation of the product, which is then recovered by separating it from the acidified reaction mixture.

The following example illustrates methods of carrying out my improved process:

Example 2-(p-nitrophenyl)-4(5)-nitroimidazole (46.8 grams or 0.2 mole) is added with stirring to 330 mls. of concentrated aqueous ammonia (4.96 moles of ammonia). To the resulting mixture is added 68 mls. of ammonium sulfide solution (0.4 mole of ammonium sulfide) with continuous stirring. After about 45 minutes' stirring, the solution becomes a deep red. The reaction mixture is exothermic at this stage, and the temperature is maintained at about 30° C. with cooling. At this point, the mixture is maintained at room temperature for about 16 hours with gentle stirring. 300 mls. of water is then added and the pH is adjusted by the slow addition of 350 mls. of concentrated hydrochloric acid to a pH of 7 with cooling. The precipitated 2-(p-aminophenyl)-4(5)-nitroimidazole is removed by filtration, washed with water until the water is neutral, and then dried in vacuo at 60° C. The products so obtained weighed 44.1 grams and melted at 269–269.5° C. with decomposition. By titration with perchloric acid in acetic acid-acetone, the 2-(p-aminophenyl)-4(5)-nitroimidazole is found to have an equivalent weight of 240, indicating that the product is 85% pure. The yield of the product obtained at this point is about 92% of theory.

42.95 grams of the product is dissolved in a hot mixture of 800 mls. of water and 215 mls. of 2.5 N hydrochloric acid and 9 grams of charcoal added. After standing for about 30 minutes, the hot mixture is filtered, cooled, and concentrated ammonium hydroxide added to a pH of about 8–9. The precipitated 2-(p-aminophenyl)-4(5)-nitroimidazole is recovered by filtration, washed with 3 × 200 mls. of water, and dried in vacuo at 60° C. to yield 30.5 grams of a golden yellow crystalline product melting at 284–284.5° C. with decomposition. The equivalent weight obtained by titration is found to be 210, indicating that the product is 97.5% pure. The overall yield of pure product is 77% of theory.

The ammonium sulfide solution used above is prepared by passing hydrogen sulfide into 100 mls. of concentrated ammonium hydroxide (29% $NH_3$) until a weight increase of 38–39 grams occurs. To the resulting ammonium sulfide solution is added 52 mls. of concentrated ammonium hydroxide to adjust the $NH_3:H_2S$ molar ratio to 2:1. The resulting solution contains 1.14 moles of ammonium sulfide and is 6.55 molar.

Following the process of the above example using 2-(o-nitrophenyl) or 2-(m-nitrophenyl)-4(5)-nitroimidazole, the corresponding 2-(o-aminophenyl) or 2-(m-aminophenyl)-4(5)-nitroimidazole is obtained.

What is claimed is:

1. The process of reducing a 2-(nitrophenyl)-4(5)-nitroimidazole compound to the corresponding 2-(aminophenyl-4(5)-nitroimidazole compound which comprises adding the nitrophenyl compound to an aqueous solution containing ammonia in an amount equivalent to at least 5 moles of ammonia per mole of nitrophenyl compound, adding thereto an aqueous solution of ammonium sulfide in an amount equivalent to at least 1 mole of ammonium sulfide per mole of nitrophenyl compound, and recovering the aminophenyl compound from the resulting reaction mixture.

2. The process of claim 1 wherein the reaction is carried out at a temperature below about 50° C. and at a pH of above 8.

3. The process according to claim 1 wherein 2-(p-nitrophenyl)-4(5)-nitroimidazole is reduced to 2-(p-aminophenyl)-4(5)-nitroimidazole.

References Cited

UNITED STATES PATENTS

| | | | |
|---|---|---|---|
| 2,464,194 | 3/1949 | Zimmerman | 260—575 |
| 3,102,146 | 8/1963 | Korman | 260—580 |

OTHER REFERENCES

Carstens et al., Chem. Abst., vol. 53, column 7215 (1959), QDI.A51.

Werner, Ind. Eng. Chem., vol. 40, p. 1574 relied on (1948), TPI.A58.

Werner, Ind. Eng. Chem., vol. 42, p. 1662 relied on (1950), TPI.A58.

Werner, Ind. Eng. Chem., vol. 51, pp. 1065–6, (1959), TPI.A58.

Yoshida et al., Chem. Abst., vol. 44, col. 3442 (1950), QDI.A51.

HENRY JILES, *Primary Examiner.*

N. TROUSOF, *Assistant Examiner.*

U.S. Cl. X.R.

260—999